April 21, 1970     B. L. SCHWALLER     3,507,486
DUAL STAGE COMPRESSOR SPRING
Filed Nov. 13, 1967     2 Sheets-Sheet 1
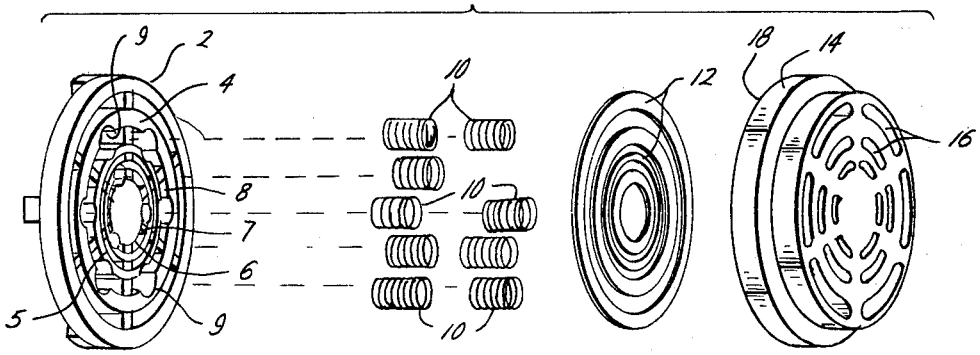
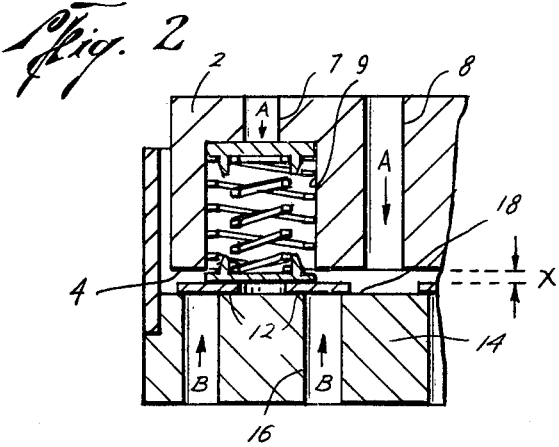
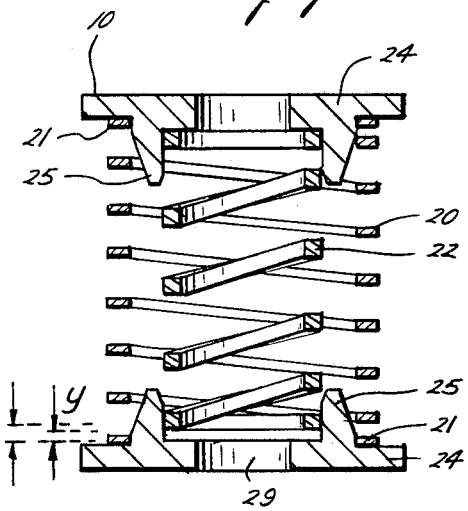
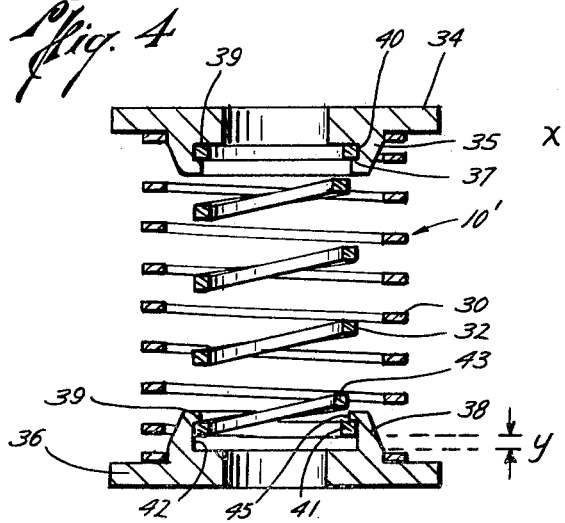
Bernard L. Schwaller
INVENTOR
BY Arnold, Roylance,
Kruger & Durkee
ATTORNEYS

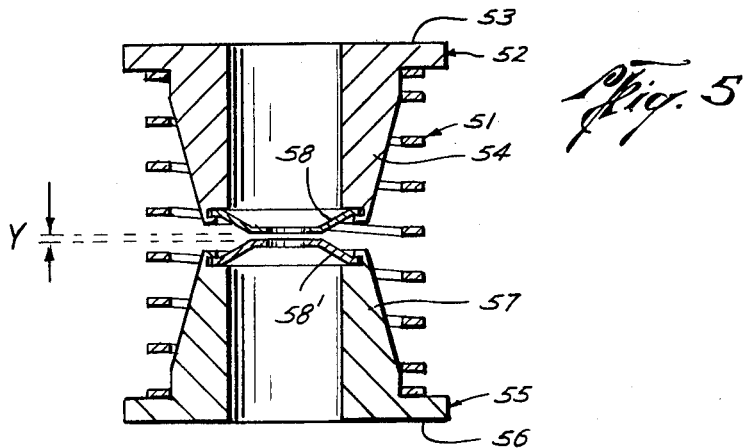
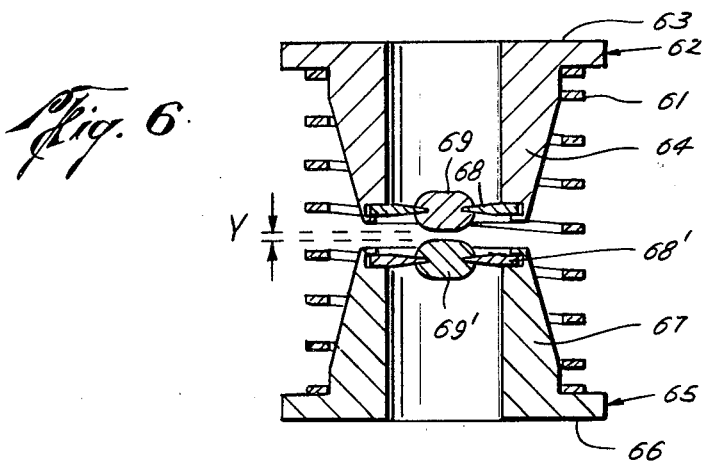
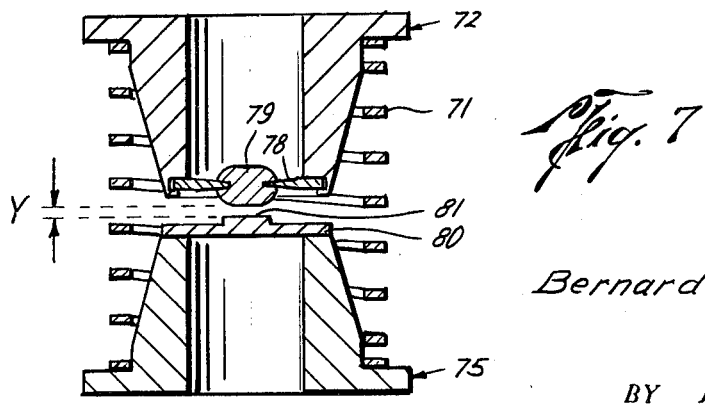

United States Patent Office 3,507,486
Patented Apr. 21, 1970

3,507,486
DUAL STAGE COMPRESSOR SPRING
Bernard L. Schwaller, 28 Hedwig Circle,
Houston, Tex. 77024
Filed Nov. 13, 1967, Ser. No. 682,220
Int. Cl. F16f 3/04
U.S. Cl. 267—1                                    17 Claims

ABSTRACT OF THE DISCLOSURE

A dual stage energy absorbing spring assembly is provided for use in compressors which operate by reciprocating movement of concentric rings to open and seal the valve and cushion the impact of the rings upon opening the valve.

The spring assemblies of this invention can comprise two concentrically disposed, oppositely helical springs which are provided with buttons at top and bottom to provide bearing surfaces. One spring is longer than the other such that as the assembly is compressed first one, then two springs resist compression, thus increasing spring rate when the second spring is engaged. In a compressor valve, the second spring engages to resist ring movement just before the rings strike the guard or returning surface which limits their movement.

BACKGROUND OF THE INVENTION

This invention relates to an improvement in valves used in fluid compressors. More specifically, this invention pertains to a spring assembly used in such valves which provides a two-stage cushioning resistance to the movement of the sealing rings that open and close the valve.

Valves commonly employed in fluid compressors to provide unidirectional flow into and out of the compressors are known in the art. In these valves, control of fluid flow is controlled by the reciprocal movement of concentric metal rings between a sealing position where the rings seat on machined seating surfaces to an open position wherein the rings are displaced from sealing engagement with these surfaces to permit fluid flow through apertures between the seating surfaces. Springs are commonly employed to hold the concentric rings against the seating surfaces to close the valve. Pressure of the fluid against the rings opens the valve by moving the rings back against the resistance of the springs, while flow in the opposite direction only serves to work with the springs and more tightly seal the valve.

The rings move against the resistance of the springs until the rings contact a second stopping surface or stop. The total distance traversed by the rings in moving from a position against the seating-sealing surface closing the valve to the position against the opposite stopping surface is known as the "lift" of the valve.

Compressors of this type usually operate at 300 to 1000 revolutions per minute, and the valves may be subjected to extremely high pressures and temperatures. At such compression speeds, the movement of the rings against the seating and stopping surfaces is extremely rapid, and under high pressure, the rings slam into the seating and stopping surfaces at high speed and with great force. Such rapid high velocity movement causes the rings to deteriorate rapidly. The constant movement compresses the spring assemblies many times per minute and causes spring failure. If a spring assembly fails and fragments fall on the seating or stopping surfaces, ring failure is greatly accelerated.

Another cause of valve failure has been spring assembly failure caused by harmonic and natural frequency vibrations or pulsations set up by the rapidly moving springs. It has been found that the force exerted by the rings in compressing the spring assemblies is so great that when the rings slam into the surface, the spring continues to compress and then spring back to contact the ring during some portion of its return to the seating surface or possibly as it is attempting to move back against spring resistance.

The present invention attempts to remedy these problems and is centered on the use of a greater number of springs and heavier springs of a higher spring rate. If the spring assemblies have spring rates that are too light, the rings compress the spring assemblies and slam back against the stopping surface with great force accelerating the wear and deterioration of the rings. However, if the spring rate is too high then the rings move too slowly and the valve causes excessive resistance to flow and high pressure drop resulting in sluggish and inefficient operation.

SUMMARY OF THE INVENTION

The instant invention provides a novel, dual-stage, energy absorbing, resilient member which may be employed in compressor valves and which provides elastic resistance to a force at two distinctly different and preferably increasing spring rates. Thus when employed in compressor valves, novel spring assemblies of this invention lightly resist the initial movement of the concentric rings from the seating surfaces of said valves at a first spring rate for a preselected portion of the valve lift and resist the movement of the rings at a second spring rate for the remaining portion of the valve lift. The second spring rate preferably provides increased resistance to ring movement away from the ring seat and accordingly cushions the spring prior to its striking the stopping surface of the valve.

Accordingly, it is a feature of the present invention to provide a compressor valve spring assembly that offers resistance at a first spring rate during a first preselected fraction of ring lift and provides a second greater resistance during the remainder of ring lift.

It is another feature of the present invention to provide a compressor valve assembly that allows quick initial opening of the rings for high efficiency but cushions the final movement of the rings to contact the stopping surfaces.

Another feature of the present invention is to provide a compressor valve spring assembly that cushions the final movement of the valve ring during its lift to dampen natural and harmonic frequency vibrations.

Another feature of the present invention is to provide a compressor valve that has a longer operating life and greater efficiency. Generally, in the present invention, the above advantages are attained by the use of a specific embodiment of this invention useful in compressor valves wherein dual concentric coil springs are employed to provide different spring rates. A larger or outer coil spring such as a helical spring which generally has a light spring rate and provides a resistance at a first spring rate to the ring movement during an initial preselected portion of the ring lift. An inner coil spring providing resistance at a heavier spring rate provides an increased resistance to ring movement during the final portion of the spring lift just prior to the contact of the rings against the stopping surfaces. The interior or cushion spring is shorter than the outer main spring to allow the main spring to be compressed through the preselected distance prior to engaging the cushion spring.

Load surfaces such as in metal buttons may be inserted in each end of the main spring to provide a uniform load bearing surface and a means for holding the inner cushion spring in desired relation to the outer main spring during use. This combined assembly also affords ease of handling and shipping since all elements of the spring are retained in a unitized assembly.

It is appreciated that as a resilient spring member such as a regularly wound helical spring or the like is compressed, that the spring resistance to the compressive force increases with the amout of compression of the spring. However, the increase of force corresponds to the spring rate for that spring. According to the instant invention, an increased resistance at a higher spring rate is provided for the ultimate compression of the spring while the initial compression was resisted at a lesser spring rate. These different spring resistances are most preferably achieved by use of two springs.

BRIEF DESCRIPTION OF THE DRAWINGS

In order that the manner in which the above recited advantages and objects of the invention are attained, as well as others which will become apparent, can be understood in detail, more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope, for the invention may admit to other equally effective embodiments.

In the drawings:

FIGURE 1 is a pictorial exploded view of a compressor valve assembly showing the relation of the spring assembly of the present invention to the remainder of the valve components.

FIGURE 2 is a detailed partial cross-sectional view of the compressor valve illustrated in FIGURE 1 showing a detailed cross-sectional view of the spring assembly in position.

FIGURE 3 is a detailed cross-sectional view of a first embodiment of the present invention utilizing two helical springs.

FIGURE 4 is a detailed cross-sectional view of another embodiment of the present invention utilizing two helical springs.

FIGURE 5 is a cross-sectional view of a further embodiment of this invention wherein Belleville springs are used as the cushion spring.

FIGURE 6 is a cross-sectional view of another embodiment of this invention wherein radially tapered springs are used as the cushion spring.

FIGURE 7 is a cross-sectional view of still another embodiment of this invention wherein a single disc-type spring is used.

DESCRIPTION OF THE PREFERRED EMBODIMENT

Referring now to the drawings and first to FIGURE 1, an exploded pictorial view of a compressor valve is shown incorporating a spring assembly of this invention. The valve is comprised of valve guard 2, spring assemblies 10, concentric sealing rings 12 and seating member 14.

Valve guard 2 has concentric ring stopping surfaces 4, 5, and 6 and apertures 7 and 8 between adjacent stopping surfaces 4 and 5, and 5 and 6, respectively. Spring retaining recesses 9 accept spring assemblies 10 to retain them in their proper position relative to concentric steel rings 12. Spring assemblies 10 urge rings 12 against the seating surfaces 18 of valve seat 14 to close apertures 16.

A detailed cross-sectional view of the compressor valve shown in FIGURE 1 is provided in FIGURE 2. Valve guard 2 with stopping surfaces 4 and 5, and apertures 7 and 8 is shown in relation to valve seat 14 with apertures 16 and seating surfaces 18. Concentric steel rings 12 are shown in sealing contact with seating surfaces 18 of valve seat 14 to seal apertures 16 to fluid passage from a downward direction as illustrated by A in FIGURE 2 and hereby close the valve. The spring recess 9 of valve guard 2 so positions the spring assemblies 10 that each spring assembly makes contact with two adjacent rings 12 urging them in sealing engagement with seating surfaces 18 of valve seat 14.

When fluid flow through the valve reverses, it will enter apertures 16 of valve seat 14 in direction B and exert force on sealing rings 12. Spring assembly 10 resists the force exerted by the fluid pressure as the rings are moved or "lifted" to the open position against stopping surfaces 4 of valve guard 2. Rings 12 lift until they make contact with stopping surfaces 4 and compress spring assembly 10 within spring recess 9. The "lift" of the valve is defined as the distance that rings 12 travel from sealing engagement with seating surfaces 18 to the full open position in contact with stopping surface 4, shown as distance X in FIGURE 2.

Referring now to the specific embodiment of FIGURE 3, illustrated in section, novel spring assembly 10 includes main spring 20, cushion spring 22, and buttons 24. Buttons 24 serve to provide a uniform load-bearing surface for the spring and a means for retaining cushion spring 22 in concentric relation within main spring 20. Cushion spring 22 is shorter in length than main spring 20 and is slidably retained between butons 24.

When employing the spring assembly of FIGURE 3 in a valve, as rings 12 lift, main spring 20 is compressed and offers a first light resistance to the exerted force. Since cushion spring 22 is shorter in length, it is not compressed during the initial portion of the lift of the rings 12. Near the completion of lift movement by rings 12, cushion spring 22 is placed in compression and the resistance to the force exerted by rings 12 is greatly increased, thus slowing the velocity of rings 12 and cushioning their impact against stopping surfaces 4, 5 and 6 of valve guard 2.

Spring assembly 10 has an outer helical main spring 20, an inner helical cushion spring 22 and buttons 24 with short projecting cylindrical sleeves 25 for retaining cushion spring 22 in concentric relation within main spring 20. Main spring 20 is for example, a right-hand wound helical coil spring of rectangular cross-section having a light spring rate. Cushion spring 22 is a left-hand wound helical coil spring of a larger rectangular cross-section than main spring 20 and usually has a greater spring rate. However, it will be appreciated that the spring rate of cushion spring 22 may be the same as or less than main spring 20. Regardless of the relative spring rates, the combined spring rate of cushion spring 22 and main spring 20 during the last portion of valve lift will provide an increased spring rate for the entire spring assembly producing the desired effect. Buttons 24 are discs of steel or the like having one flat load bearing surface and a short cylindrical sleeve 25 centered on and projecting from the other surface.

As stated above, the main spring 20 and cushion spring 22 are preferably oppositely wound. This opposite winding of the main spring and the cushion spring results in the spring assembly of this invention having a more uniform and "flat" resistance to force without a tendency for the assembly to yield more on one side than another. Accordingly, a more uniform resistance is applied to both concentric rings which contact each spring assembly, thus inducing a uniform resistance to the movement of the rings to open the valve.

In addition, it should be noted that both outer main spring 20 and cushion spring 22 are preferably rectangular in cross section. Providing rectangular cross section makes control of spring rate of each spring much easier. Thus, an outer spring such as provided in the assembly of FIGURE 3 wherein the cross section is rectangular such that the height of a cross section is much less than the width, enables providing a spring of low spring rate while not sacrificing the strength of the spring members. Of course, the use of a rectangular spring also provides the spring with a flat surface on its uppermost and lowermost coils to more readily accommodate the steel buttons above and below the spring assembly. In addition, the rectangular cross section of the spring prevents sloughing of the spring in the compressed condition. Thus, if one of the coils of outer spring 20 were during a rapid compression to contact the next lower coil of the spring, two flat surfaces would engage and there would be no tendency for the upper coil to slip within or without the lower coil. Using springs of round cross section might cause upper spring members to slough during such compression, thus resulting in possible deformation of the spring.

The outer diameter of sleeve 25 on button 24 is slightly larger than the inner diameter of cylindrical main coil spring 20 so that when sleeve 25 is inserted in each end of main spring 20, the end coils 21 of spring 20 frictionally grip the outer surface of sleeve 25 to retain button 24. The uppermost and lowermost coils of spring 20 are preferably formed or ground to have a flat planar upper surface to bear uniformly upon buttons 24. Buttons 24 are also provided with central holes 29 to permit passage of fluid.

The inner diameter of sleeve 25 is slightly larger than the outer diameter of cylindrical cushion spring 22, so that cushion spring 22 can be slidably retained within the opposed cylindrical receptacles defined by oppositely spaced sleeves 25 of buttons 24 inserted into each end of main spring 20. Again, if desired, cushion spring 22 can be secured to one of the buttons. Thus, spring 22 in FIGURE 3 can have its upper surface secured to the top button.

Cushion spring 22 is shorter than main spring 20 by a preselected amount so that cushion spring 22 is not engaged and compressed by buttons 24 until main spring 20 has been compressed by an amount Y in FIGURE 3 which is a fraction of valve lift X. Cushion spring 22 will then be compressed during the remaining fraction of lift to provide a final cushioning resistance, and an increased spring rate, to rings 12 prior to their impact with stopping surfaces 4, 5, and 6. It is also appropriate to form or grind the uppermost and lowermost coils on cushion spring 22 so that they bear uniformly on the buttons.

Typically, valve lift on compressor valve ranges from approximately 0.060 inch to about 0.100 inch. Of course, lift can be greater or less in various valves depending upon their size, the type of compresor with which they are utilized, the pressures to be encountered, and the properties of the fluid being compressed. The first distance that ring 12 will move while compressing main spring 20 prior to engaging cushion spring 22 is preferably a fraction of the total lift, e.g., from about 50 percent to 80 or 90 percent of the total valve lift.

Thus, for example, in FIGURE 3, distance Y would be preferably 50 to about 90 percent of valve lift X. Buttons 24 will compress main spring 20 alone through distance Y which is 50 to 90 percent of the total valve lift prior to engaging cushion spring 22 for compression during the final 10 to 50 percent of the valve lift. Stroke Y of main coil spring 20 is preselected to provide a range of 50 to 90 percent of lift X in most valves although it is to be understood that stroke Y can be a greater or a lesser fraction depending upon various factors to be considered for each valve in its use in a particular application. Normally, stroke Y may be maintained at 80 to 90 percent of total valve lift, so that the cushion spring engages only in the last 10 to 20 percent of the valve lift.

Main spring 20 and cushion spring 22 may be constructed of stainless steel, Inconel-X or like metals to provide stress corrosion resistance and resistance to hydrogen embrittlement where this is a problem. Stress corrosion resistance is resistance to chemical and thermal degradation and corrosion which these special metals exhibit even under stress. However, it is not material to the proper function of this invention that such special metals be utilized, and any suitable spring steel may be used. In the case of the cushion spring, particularly in cases where Belleville or disc springs are used the cushion spring need not be metallic at all but may be of suitable plastic material or an elastic rubbery material.

FIGURE 4 is a detailed cross-sectional view of another embodiment of the present invention. Spring assembly 10' has an outer main right-hand wound, helical spring 30 of rectangular cross section having a light spring rate identical to the main spring previously discussed. Similarly cushion spring 32 is a left-hand wound helical spring of a larger cross section than main spring 30 and has a greater spring rate.

Buttons 34 and 36 are similar to the buttons previously discussed and have one flat load-bearing surface. The reverse sides of buttons 34 and 36 have a flat surface with short cylindrical sleeves 35 and 38, respectively, projecting from their inward side. Sleeve 35 of button 34 has an inwardly projecting lip 37 that will accept and retain the uppermost coil 39 of cushion spring 32 within sleeve recess 40. Sleeve 38 of button 36 has an inwardly projecting lip 39, similar to lip 37 of sleeve 35. Lip 39 accepts and retains the first coil 41 of cushion spring 32. However, sleeve recess 42 is deeper than similar sleeve recess 40 of button 34 to allow entrance of lowermost coil 41 and to leave sufficient space for first coil 41 to slide vertically within sleeve recess 42 of sleeve 38 to provide stroke Y as previously discussed with respect to the FIGURE 3 embodiment. Second coil 43 of cushion spring 32 has its outer edge 44 ground away or has a second coil of small diameter to allow second coil 43 to pass face 45 of lip 39 unhindered as cushion spring 32 slides into button 36 the necessary distance of stroke Y.

The considerations pertaining to the composition of the spring wire and the size of valve lift X and main spring stroke Y are similar to those earlier discussed for the previous embodiment.

Referring now to FIGURES 5 through 7, there are illustrated further embodiments of this invention wherein disc-type springs are employed to provide the cushioning effect. These disc-type springs are known in the art and include Belleville springs, radially tapered disc springs and the like. This type of spring is compact and is capable of resisting quite large forces.

In FIGURE 5, an outer helical spring 51 similar to the helical springs in FIGURES 3 and 4 is fit on each end with upper and lower buttons 52 and 55 which have outwardly facing flat bearing surfaces 53 and 56. The buttons also have inwardly protruding cylindrical portions 54 and 57 which are employed to mount the disc-type springs which are specifically Belleville springs in the case of FIGURE 5. Two Belleville springs 58 and 58' are mounted at the innermost portion of cylindrical mounts 54 and 57 and are spaced with their convex faces in opposing relation spaced apart by distance Y which is the stroke of the assembly as discussed above and corresponds to 50 to 90 percent of overall valve lift.

FIGURE 6 shows a similar assembly employing two radially tapered springs mounted in the cylindrical extensions 64 and 67 of buttons 62 and 65 respectively. Again an outer helical spring 61 is fitted to the buttons. Radially tapered disc springs 68 and 68' comprise inwardly tapered discs 68 and 68' each of which discs mounts a central engaging and force transmitting hub. The opposing surfaces of hubs 69 and 69' are again spaced by the distance Y corresponding to the desired stroke of the spring.

Although FIGURES 5 and 6 show dual stage spring assemblies using opposed pairs of disc springs to provide cushioning, it is not necessary that two opposed Belleville springs or radially tapered springs be used. Accordingly, in FIGURE 7, there is shown a dual stage spring assembly employing a single radially tapered disc spring mounted on button 72 within helical spring 71 similar to those springs in FIGURE 6. Thus, the spring has a tapered disc 78 and a central hub 79. Opposed to the central hub 79 is a surface formed by rigid member 80 fixedly mounted on buttons 75 which presents an opposing nonresilient raised surface 81 to the lower face of hub 79. The spacing between surface 81 and hub 79 shown as distance Y is the stroke of the spring which again preferably corresponds to about 50 to 90 percent of total valve lift. It will be appreciated that a similar single disc spring device could employ a Belleville rather than a radially tapered spring as is illustrated.

It should be understood that although the specific embodiments herein illustrate the use of regularly wound helical coil springs, Belleville springs, and radial disc springs as the resilient or elastic members used in the assemblies of this invention, other spring members may also be employed. For example, particularly for the inner cushion spring a bow spring may be used. In another variation, the outer spring may be employed as a cushioning spring and the inner spring may be made to function as the main spring. In such a design, of course, the inner main spring would extend entirely from the upper to the lower button while the outer cushion spring would be shorter in length.

Dual-stage energy absorbing assemblies utilizing the invention herein described can have many applications not limited to compressor valves. For instance, coil spring automobile suspensions utilizing the present invention would provide a lighter ride with a softer cushion. Similarly, such dual-stage energy absorbing spring assemblies could be utilized as spring returns for hydraulic cylinders and other shock absorbing mounts for rotating or reciprocating machinery. In each case, the cushion spring would be engaged at some desired fraction of the overall compressibility of the first main spring.

Numerous variations and modifications may obviously be made in the structures herein described without departing from the present invention. Accordingly, it should be clearly understood that the forms of the invention described herein and shown in the figures of the accompanying drawings are illustrative only and are not intended to limit the scope of the invention.

What is claimed is:

1. In a compressor valve having a guard member, a seat member, closure means adapted to be lifted from sealing engagement with said seat ember to said guard member for a distance correponding to valve lift, and resilient members for urging said closure means against said seat member, the improvement wherein:
said resilient members are spring assemblies which develop a first resistance to the movement of said closure means toward said guard member at a first spring rate during a first preselected portion of valve lift, and a second greater resistance at a second spring rate to the movement of said closure means toward said guard member during the remaining portion of valve lift.

2. The apparatus as described in claim 1 wherein said resilient members comprise:
a first coil spring,
a second coil spring concentrically disposed with respect to said first coil spring, said second coil spring being shorter than said first coil spring by an amount equal to said first preselected portion of total valve lift.

3. The apparatus of claim 2 wherein said second coil spring is shorter than said first coil spring by an amount of from about 50 to about 90 percent of total valve lift.

4. The apparatus of claim 2 wherein said first coil spring is oppositely wound from said second coil spring.

5. The apparatus of claim 2 wherein in the coils of said first and said second springs are rectangular in cross section.

6. The apparatus of claim 2 wherein said second coil spring has a greater spring rate than said first coil spring.

7. The apparatus of claim 2 wherein said second coil spring is disposed concentrically within said first coil spring.

8. The apparatus of claim 7 including retaining means holding said springs in concentric relation comprising upper and lower buttons having outwardly facing bearing surfaces and having means for frictionally engaging said first coil spring and to slidably receive said second coil spring.

9. The apparatus of claim 8 wherein said sleeves of said buttons are provided with inwardly protruding lips to retain said second coil spring within said sleeve.

10. The apparatus of claim 1 wherein said resilient members comprise:
a first coil spring,
first and second buttons affixed to the ends of said first coil spring, and
a disc-type spring assembly mounted on at least one of said buttons and having its resilient surface spaced from an engaging surface on the second of said buttons by said preselected portion of valve lift.

11. The apparatus of claim 10 wherein said disc-type spring assembly comprises two Belleville springs mounted on each said first and said second buttons, the convex faces of said Belleville springs being spaced from each other by 50 to 90 percent of total valve lift.

12. The apparatus of claim 10 wherein said disc-type spring assembly comprises two radially tapered springs having central force transmitting hubs mounted on each said first and said second buttons, the said hubs being spaced from each other by 50 to 90 percent of total valve lift.

13. The apparatus of claim 10 wherein a disc-type spring is mounted on the first of said buttons having its resilient surface spaced from an opposed unyielding surface on said second button by 50 to 90 percent of total valve lift.

14. The apparatus of claim 13 wherein said disc spring is a Belleville spring.

15. The apparatus of claim 13 wherein said disc spring is a radially tapered spring.

16. In a compressor valve wherein valve operation is accomplished by lift of ring members away from sealing engagement with a seat member to a guard member to permit flow through the valve, the improvement in combination therewith of a plurality of spring assemblies for holding said rings against said seat comprising:
a first helical spring having coils of rectangular cross section,
a second oppositely wound helical spring concentrically disposed with respect to said first helical spring, said second helical spring having a rectangular cross section and possessing a greater spring rate than said first helical spring, said second helical spring being shorter than said first helical spring by a fractional amount of the total lift of said valve, and
upper and lower buttons affixed to said first helical spring and having means to maintain said second helical spring concentrically disposed to said first helical spring.

17. The apparatus of claim 16 wherein said second helical spring is shorter than said first helical spring by from about 50 to about 90 percent of the total valve lift.

References Cited

UNITED STATES PATENTS

| | | |
|---|---|---|
| 1,628,749 | 5/1927 | Samuels. |
| 2,660,423 | 11/1953 | Roy. |
| 3,298,337 | 1/1967 | Thompson. |

JAMES B. MARBERT, Primary Examiner